E. C. ROYER AND B. J. BOYLE.
ANCHOR BOLT.
APPLICATION FILED AUG. 19, 1919.
1,344,720. Patented June 29, 1920.
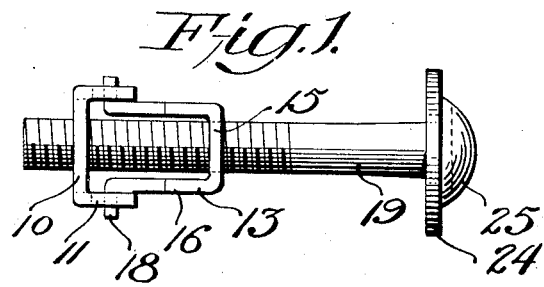
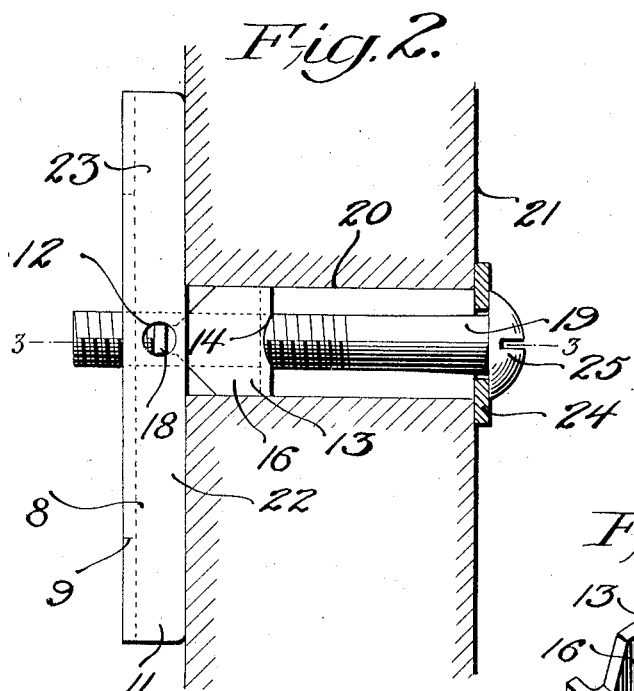
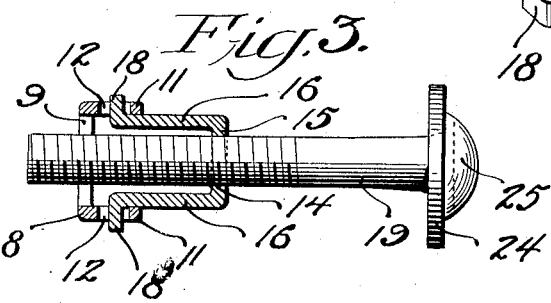
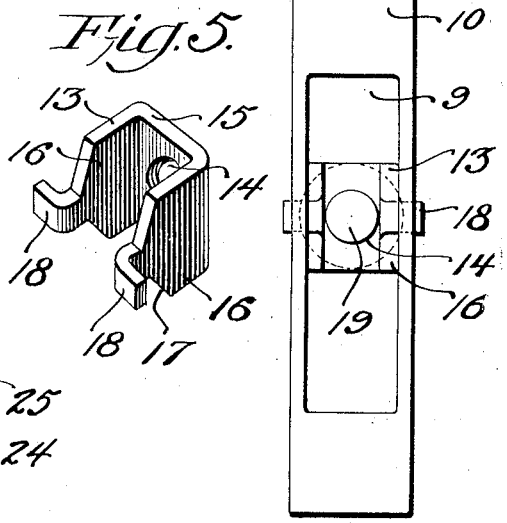
Witnesses:
Inventors
Edwin C. Royer
and Bernard J. Boyle
By Joshua R. H. Potts
their Attorney

UNITED STATES PATENT OFFICE.

EDWIN C. ROYER AND BERNARD J. BOYLE, OF PHILADELPHIA, PENNSYLVANIA.

ANCHOR-BOLT.

1,344,720.　　　　　　Specification of Letters Patent.　　Patented June 29, 1920.

Application filed August 19, 1919. Serial No. 318,589.

*To all whom it may concern:*

Be it known that we, EDWIN C. ROYER and BERNARD J. BOYLE, citizens of the United States, residing at Philadelphia, county of Philadelphia, and State of Pennsylvania, have invented certain new and useful Improvements in Anchor-Bolts, of which the following is a specification.

One object of our invention is to provide an improved anchor bolt which can be quickly and easily manipulated for the purpose of securely holding articles of various characters to a wall, partition or the like.

Another object is to make our improved anchor bolt of such construction that it can be stamped or cut from sheet metal and easily connected together.

A still further object is to so make our improved anchor bolt that the parts can be positioned to easily permit the insertion of a screw or bolt so as to save time in the joining of the parts.

These objects, and other advantageous ends which will be described hereinafter, we attain in the following manner, reference being had to the accompanying drawings in which Figure 1 is a top plan view of our improved anchor bolt, Fig. 2 is a side elevation showing our improved anchor bolt secured to a wall; the wall being illustrated in section, Fig. 3 is a sectional view taken on the line 3—3 of Fig. 2; the wall being omitted, Fig. 4 is a rear view of our improved anchor bolt showing the same in the position occupied in Fig. 2, Fig. 5 is a perspective view of a yoke nut which is formed out of sheet metal, and Figs. 6 and 7 are respective face and edge views of the sheet metal before the same is bent into the form illustrated in Fig. 5.

Referring to the drawings, 8 represents a sheet metal channel which has a slot 9 cut in the rear face 10 thereof, as clearly shown in Figs. 2, 3 and 4. The sides 11 of the channel extend at substantially right angles to the face 10 and have oppositely disposed circular holes 12. A yoke nut 13 has a screw threaded hole 14 in its front face 15 and has sides 16 which are bent substantially at right angles to the face 15. The free ends of the sides 16 are tapered as shown at 17 and lips 18 project from the central portion thereof and are bent substantially parallel with the face 15. The sides 16 of the yoke are of such distance apart that they can be inserted between the sides 11 of the channel 8 and the lips 18 are adapted to freely enter the holes 12 so that the channel 8 can swing on said lips as a pivot. The lips 18 can be inserted within the holes 12 by slightly compressing the sides 16 of the yoke to permit the lips 18 to be inserted between the sides 11 of the channel and when in line with the holes 12 the sides 16 by being released will expand so as to push the lips 18 into the holes 12. The sides 16 are of such width that when in the position shown in Fig. 2, the face 15 of the yoke will be positioned at a suitable distance from the channel 8 and can be freely grasped to permit a screw bolt 19 to be screwed into the screw threaded hole 14, said screw bolt when screwed into place being adapted to pass between the sides of the yoke and the sides of the channel 8 and out through the slot 9, as clearly shown in Figs. 1, 2 and 3. By this construction it will be noted that when desired to insert the channel through a hole in a wall, such for example as the hole 20 illustrated in the wall 21 in Fig. 2, said channel can be swung so as to be substantially parallel within its length to the axis of the screw bolt 19. The end 22 of the channel 8 is preferably made heavier than the opposite end 23 thereof so that after passing entirely through the hole 20 in the wall, the end 22 will swing downwardly by gravity so as to cause the channel 8 to span the hole 20. Then by tightening the screw 19, the device will be securely held to the wall. A washer 24 or other suitable means can be interposed between the head 24 of the screw bolt 19 and thereby firmly secured to the wall.

One of the important and valuable features of our invention is that by the construction above described and illustrated in the drawing the yoke and channel can be firmly held between the thumb and first finger of one hand while the screw bolt can be accurately and quickly directed to and inserted within the hole 14. Furthermore, the device can be made quickly from sheet material and the yoke 13 forms a guiding or steadying means within the hole of a wall.

While we have described our invention as taking a particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. An anchor bolt including a channel; a yoke pivotally connected to said channel and having a screw threaded hole located in the face connecting the sides of said yoke; and a screw bolt for engagement with said threaded hole; substantially as described.

2. An anchor bolt including a channel having holes in the opposite side thereof; a yoke having lips thereon extending within said holes in the channel, said yoke having a screw threaded hole in the face spanning the sides thereof; and a bolt fitting said screw threaded hole; substantially as described.

In testimony whereof we have signed our names to this specification in the presence of two subscribing witnesses.

EDWIN C. ROYER.
B. J. BOYLE.

Witnesses:
 CHAS. E. POTTS,
 ANNA RENTON.